United States Patent [19]

Magee et al.

[11] Patent Number: 4,725,630
[45] Date of Patent: Feb. 16, 1988

[54] α, β-UNSATURATED CARBONYL-FUNCTIONAL SILICONE COMPOSITIONS

[75] Inventors: Walter L. Magee, Adrian; Eugene R. Martin, Onsted, both of Mich.

[73] Assignee: Wacker Silicones Corporation, Adrian, Mich.

[21] Appl. No.: 56,183

[22] Filed: Jun. 1, 1987

[51] Int. Cl.$^4$ .......................... C08F 2/50; C08F 4/34; C08F 30/08; C08F 28/04

[52] U.S. Cl. .................................. 522/99; 526/279; 528/30; 556/427; 556/429

[58] Field of Search .................. 522/99; 556/427, 429; 528/21, 25, 26, 30; 526/279

[56] References Cited

U.S. PATENT DOCUMENTS

| | | | |
|---|---|---|---|
| 3,532,729 | 10/1970 | Cekada | 528/24 |
| 3,816,282 | 6/1974 | Viventi | 522/57 |
| 4,064,027 | 12/1977 | Gaat | 522/172 |
| 4,070,526 | 1/1978 | Colguhoun | 522/99 |
| 4,606,933 | 8/1986 | Griswold | 428/447 |

*Primary Examiner*—Lewis T. Jacobs
*Assistant Examiner*—David Buttner

[57] ABSTRACT

Polymerizable α, β-unsaturated carbonyl-functional silicone compositions are obtained from the reaction of thiol-functional organopolysiloxanes with an α, β-unsaturated carbonyl-functional compound having at least two acryloyl or methacryloyl groups or mixtures thereof per molecule in the presence of a base catalyst.

The α, β-unsaturatured carbonyl-functional silicone compositions may be combined with a photosensitizer and/or a free radical generator and polymerized by radiation and/or heat.

29 Claims, No Drawings

α, β-UNSATURATED CARBONYL-FUNCTIONAL SILICONE COMPOSITIONS

The present invention relates to polymerizable silicone compositions, particularly to α,β-unsaturated carbonyl-functional silicone compositions and more particularly to α,β-unsaturated carbonyl-functional organopolysiloxanes containing thioether groups, which may be polymerized in the presence of heat and/or by exposure to a radiation source.

BACKGROUND OF THE INVENTION

Radiation polymerizable compositions containing organopolysiloxanes having silicon vinyl groups and organopolysiloxanes containing mercaptoalkyl constituents are described, for example, in U.S. Pat. No. 3,816,282 to Viventi.

U.S. Pat. No. 4,064,027 to Gant also describes a composition containing a mercaptofunctional siloxane and a vinyl containing siloxane which is curable by radiation.

U.S. Pat. No. 4,070,526 to Colquhoun et al discloses a radiation curable composition containing a mercaptoalkyl substituted polydiorganosiloxane fluid and a vinyl monomer such as an acrylate and a photosensitizer.

U.S. Pat. No. 4,606,933 to Griswold et al discloses acrylate-functional silicone compounds which are prepared by reacting acrylate-containing compounds with an aminosilane or an aminofunctional polysiloxane in the presence of a base catalyst.

U.S. Pat. No. 3,532,729 to Cekada et al discloses the preparation of siloxane emulsions by reacting a mercapto organosiloxane emulsion with a polymerizable olefin such as an acrylate or methacrylate in the presence of a free radical catalyst.

In contrast to the method described in Cekada, the present invention reacts an acrylic and/or methacrylic compound having at least two acryloyl groups or methacryloyl groups or mixtures thereof per molecule with a thiol-functional organopolysiloxane having one or more thiol (SH) groups per molecule in the presence of a base catalyst to form compositions having acrylic and/or methacrylic functionality. These compositions can be cured in the presence of a radiation source, or in the presence of heat.

It is, therefore, an object of the present invention to provide α,β-unsaturated carbonyl-functional polysiloxanes. Another object of the present invention is to provide α,β-unsaturated carbonyl-functional polysiloxanes having at least one acryloyl or methacryloyl group per molecule. Another object of the present invention is to provide α,β-unsaturated carbonyl-functional polysiloxanes containing acryloyl or methacryloyl groups, which are very reactive under radiation conditions. Still another object of the present invention is to provide α,β-unsaturated carbonyl-functional polysiloxanes in which the acryloyl or methacryloyl group is bonded to the silicon atom via a thioether group. A further object of the present invention is to provide a process for preparing α,β-unsaturated carbonyl-functional polysiloxanes. A still further object of the present invention is to provide α,β-unsaturated carbonyl-functional polysiloxanes which are curable in the presence of heat and/or a radiation source.

SUMMARY OF THE INVENTION

The foregoing objects and others which will become apparent from the following description are accomplished in accordance with this invention, generally speaking, by providing α,β-unsaturated carbonyl-functional organopolysiloxanes which are obtained by reacting a thiol-functional organopolysiloxane having at least one unit of the general formula

with an α,β-unsaturated carbonyl compound having at least two acryloyl or methacryloyl groups or mixtures thereof per molecule of the formula

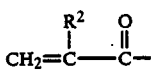

where R is a monovalent hydrocarbon radical having from 1 to 20 carbon atoms, a substituted monovalent hydrocarbon radical having from 1 to 20 carbon atoms, and monovalent hydrocarbonoxy radicals having from 1 to 10 carbon atoms, $R^1$ is a substituted or unsubstituted divalent, trivalent or tetravalent hydrocarbon radical free of aliphatic unsaturation and having from 1 to 20 carbon atoms, hydrocarbon ether, hydrocarbon thioether, hydrocarbon ester and hydrocarbon thioester radicals, in which $R^1$ is attached to the silicon atom via a silicon-carbon bond, $R^2$ is hydrogen or a methyl group, a has a value of 1, 2 or 3, b has a value of 1 or 2, and c has a value of from 0 to 2, with the sum of b+c being from 1 to 3.

These compositions may be polymerized by exposure to ionizing or actinic nonionizing radiation, such as electron beam, ultraviolet light, X-ray, gamma ray, and beta rays.

DESCRIPTION OF THE INVENTION

The thiol-functional polysiloxanes employed in the present invention have at least one unit of the general formula

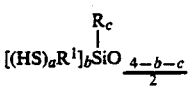

where R is a monovalent hydrocarbon radical or a substituted monovalent hydrocarbon radical having from 1 to 20 carbon atoms or a hydrocarbonoxy radical having from 1 to 10 carbon atoms $R^1$ is a substituted or unsubstituted divalent, trivalent, or tetravalent hydrocarbon radical free of aliphatic unsaturation and having from 1 to 20 carbon atoms, hydrocarbon ether, hydrocarbon thioether, hydrocarbon ester and hydrocarbon thioester radicals in which $R^1$ is attached to the silicon atom via a silicon-carbon bond, a is 1, 2 or 3, b is 1 or 2, and c is 0 to 2 with the sum of b+c being equal to 1 to 3.

Examples of suitable monovalent hydrocarbon radicals represented by R above are alkyl radicals such as the methyl, ethyl, propyl, butyl, pentyl, hexyl, octyl, decyl, and octadecyl radicals; aryl radicals such as the phenyl, diphenyl and naphthyl radicals; alkenyl radicals such as the vinyl and allyl radicals; alkaryl radicals such as tolyl, xylyl and ethylphenyl radicals; aralkyl radicals such as benzyl, alpha-phenylethyl, beta-phenylethyl, alpha-phenylbutyl and cycloalkyl radicals such as cyclobutyl, cyclopentyl, and cyclohexyl radicals.

Examples of substituted hydrocarbon radicals represented by R are halogenated hydrocarbon radicals, such as haloalkyl radicals, for example, the 3,3,3-trifluoropropyl radical and haloaryl radicals, such as o-, m- and p-chlorophenyl radicals.

Examples of hydrocarbonoxy radicals represented by R are methoxy, ethoxy, propoxy, butoxy, hexoxy, octoxy, decoxy and phenoxy radicals.

Examples of suitable divalent hydrocarbon radicals represented by $R^1$ above are methylene, ethylene, trimethylene, tetramethylene, hexamethylene, octamethylene and the like. Suitable examples of other hydrocarbon radicals are represented by the following formulas
(—CH$_2$)$_2$CHCH$_2$CH$_2$—, (—CH$_2$CH$_2$)(—CH$_2$)CH(CH$_2$)$_4$—, (—CH$_2$CH$_2$)$_3$CCH$_2$CH$_2$—, (—CH$_2$CH$_2$)(—CH$_2$)CHCH(CH$_2$—)CH$_2$CH$_2$CH$_2$—, (—CH$_2$)$_5$CH(CH$_2$CH$_2$—)CH$_2$CH$_2$CH(CH$_2$CH$_3$) and (—CH$_2$CH$_2$)$_2$CHCH$_2$CH$_2$—.

Examples of hydrocarbon ether and hydrocarbon thioether radicals represented by $R^1$ having from 3 to 20 carbon atoms are those of the general formula —(CH$_2$)$_d$(XC$_e$H$_{2e}$)$_f$— where X is oxygen or sulfur, d is a number of from 1 to 4, e is a number of from 2 to 4, and f is a number of at least 1 and the sum of d+f is a number such that the radical has from 3 to 20 carbon atoms. Specific examples of hydrocarbon ether and hydrocarbon thioether radicals are represented by the formulas —CH$_2$(XC$_2$H$_4$)$_2$—, —C$_2$H$_4$(XC$_3$H$_6$)$_3$, —C$_3$H$_6$(XC$_3$H$_6$)$_5$—, —C$_4$H$_8$(XC$_3$H$_6$)$_4$—, —C$_2$H$_4$(XC$_4$H$_8$)$_3$— and the like, where X is the same as above.

Examples of hydrocarbon ether and hydrocarbon thio-ether radicals represented by $R^1$ are radicals of the formula
—CH$_2$CH$_2$—O—CH(CH$_3$)CH$_2$—,
—CH$_2$CH$_2$CH$_2$—O—CH(CH$_3$)CH$_2$OCH$_2$—,
—(CH$_2$)$_2$CHSCH$_2$CH$_2$CH$_2$—,
(—CH$_2$)$_2$(C$_2$H$_5$)CCH$_2$SCH$_2$CH$_2$CH$_3$—,
(—CH$_2$)$_3$CCH$_2$SCH$_2$CH$_2$CH$_2$—,
—(CH$_2$)(—CH$_2$CH$_2$CH$_2$)CHSCH$_2$CH$_2$CH$_2$—,
(—CH$_2$CH$_2$)$_2$CHCH$_2$SCH$_2$CH$_2$CH$_2$—,
(—CH$_2$)$_2$(C$_2$H$_5$)CCH$_2$SCH$_2$CH$_2$S(CH$_2$)$_3$— and
(—CH$_2$)$_3$CCH$_2$S(CH$_2$)$_3$S(CH$_2$)$_3$—.

Examples of hydrocarbon ester and hydrocarbon thioester radicals represented by $R^1$ are radicals of the formula $$-CH_2CH_2\overset{O}{\overset{\|}{C}}-O-CH(CH_3)CH_2-$$

$$-CH_2CH_2CH_2-CH(CH_3)CH_2\overset{O}{\overset{\|}{C}}-O-CH_2-$$

$$(-CH_2)_3CHCH_3CH_2\overset{S}{\overset{\|}{C}}SCH_2CH_2CH_2-.$$

$$(CH_2)_3CCH_2\overset{S}{\overset{\|}{C}}SCH_2CH_2CH_2-,$$

$$(CH_2)_2(C_2H_5)CCH_2\overset{S}{\overset{\|}{C}}CCH_2CH_2CH_2-,$$

$$(CH_2)_2(C_2H_5)CCH_2SCH_2CH(CH_3)\overset{O}{\overset{\|}{C}}OCH_2CH_2CH_2-\text{ and}$$

$$(CH_2)_3CCH_2SCH_2CH(CH_3)\overset{O}{\overset{\|}{C}}OCH_2CH_2CH_2-.$$

Generally, the thiol-functional polysiloxanes employed in this invention preferably contain at least one thiol-functional siloxy unit of the formula $$[(HS)_aR^1]_b\overset{R_c}{\underset{|}{Si}}O_{\frac{4-b-c}{2}}$$

per molecule where R, $R^1$, a, b and c are the same as above. In the formula, b preferably has a value of 1 or 2, and most often has a value of 1. Any remaining valences on the silicon atom of the thiol-functional polysiloxanes are satisfied either by an R group or oxygen atoms.

The remaining siloxy units of the thiol-functional polysiloxanes may consist of a combination of units selected from R$_2$SiO units, R$_3$SiO$_{0.5}$ units, RSiO$_{1.5}$ units, $$(HS)_aR^1\overset{R}{\underset{|}{Si}}O \text{ units and } (HS)_aR^1\overset{R}{\underset{|}{\underset{R}{Si}}}O_{0.5} \text{ units,}$$

where R is a monovalent hydrocarbon radical having from 1 to 20 carbon atoms, a halogenated monovalent hydrocarbon radical having from 1 to 20 carbon atoms and monovalent hydrocarbonoxy radicals having from 1 to 10 carbon atoms and $R^1$ is a substituted or unsubstituted divalent, trivalent or tetravalent hydrocarbon radical free of aliphatic unsaturation and having from 1 to 20 carbon atoms, hydrocarbon ether, hydrocarbon thioether, hydrocarbon ester and hydrocarbon thioester radicals. These thiol-functional polysiloxanes contain an average of at least 1 sulfur containing siloxane unit per molecule.

The thiol-functional polysiloxanes employed in the reaction with the α,β-unsaturated carbonyl compounds may have a viscosity of from 10 to 2,000,000 mPa.s and more preferably from about 1000 to 500,000 mPa.s at 25° C. They may be homopolymers having siloxane units as set forth above, as well as copolymers of such siloxane units with siloxane units of the general formula $$R_gSiO_{\frac{4-g}{2}}$$

where R is the same as above and g can be 0, 1, 2 or 3.

The thiol-functional polysiloxanes employed in this invention are well known in the art. They may be prepared, for example, in accordance with the process described in U.S. Pat. No. 4,046,795 to Martin in which a thiol-functional silane or polysiloxane is reacted with a cyclic siloxane in the presence of an acid catalyst. Also, these thiol-functional polysiloxanes may be prepared in accordance with the process described in U.S. Pat. No. 3,388,144 to Musolf et al, in which a siloxane containing 1 or 2 mercaptoalkyl groups per silicon atom is reacted with a polyhydroxylated carbon compound containing an unsaturated olefinic group in the presence of a peroxide catalyst. Another method for preparing thiol-functional polysiloxanes is described in U.S. Pat. No. 4,622,412 to Piskoti, in which a mixture containing a mercapto-functional silane and an alkoxy alkyl silane is hydrolyzed in the presence of an acid catalyst, and then the resultant product is mixed with a polysiloxane chain extender and an endblocking organopolysiloxane. Other thiol-functional polysiloxanes which may be employed in the present invention are those prepared in accordance with the procedure described in, for example, U.S. Pat. No. 2,960,492 to Morton et al. Also, U.S. Pat. No. 4,272,415 to Homan et al describes a method for preparing mercaptoorganopolysiloxanes by reacting hydroxyl-endblocked polydimethylsiloxanes with mercaptoalkyltrialkoxysilanes in the presence of potassium hydroxide. The thiolfunctional polysiloxanes described in these references and their methods of preparation are incorporated herein by reference.

The $\alpha,\beta$-unsaturated carbonyl compound employed in the present invention may be either a linear or branched chain structure provided that it has at least two acryloyl or methacryloyl groups of the formula

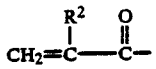

per molecule, where $R^2$ is hydrogen or a methyl group. The $\alpha,\beta$-unsaturated carbonyl compound may be further represented by the formula

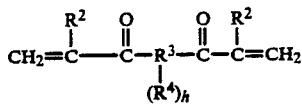

where $R^2$ is the same as above, $R^3$ is a linear or branched radical having 2, 3, 4, 5 or 6 valences in which the radical is selected from a substituted hydrocarbon radical or a hydrocarbon ether or thioether radical having 1 or more repeating units, and the terminal atoms of the $R^3$ radical are selected from oxygen or nitrogen, and $R^4$ is a radical linked to the terminal oxygen or nitrogen atoms or $R^3$ and is selected from the group consisting of a monovalent hydrocarbon radical having from 1 to 20 carbon atoms, an acryloyl and/or methacryloyl radical and when the terminal atom of $R^3$ is oxygen, then $R^4$ may also be hydrogen; and h is an integer of from 0 to 4.

The $R^3$ radical is bonded to the carbonyl radicals by oxygen or nitrogen atoms and provides sites for linking up to four additional acryloyl or methacryloyl groups. The $R^3$ radical contains carbon and hydrogen atoms, and in addition, may contain non-terminal oxygen, sulfur and nitrogen atoms.

More specifically, $R^3$ may be further represented by the formulas $R^5O_k$ or $R^6N_k$, where $R^5$ is represented by the radicals

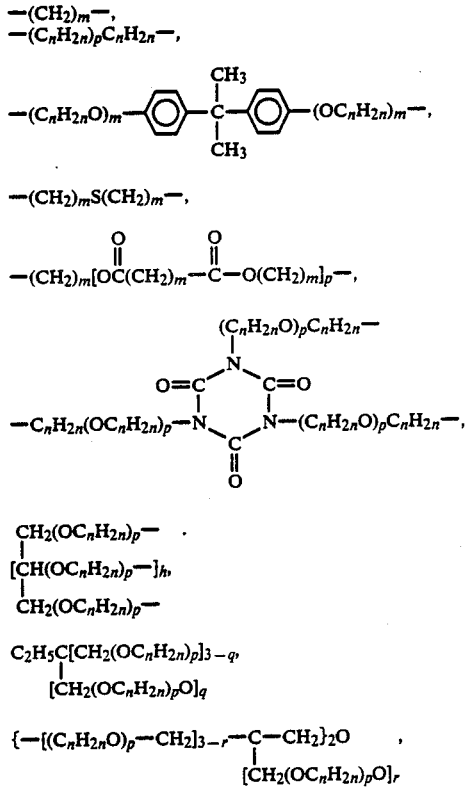

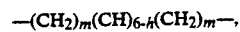

where the unsatisfied valences on the carbon atoms of $R^5$ are satisfied by oxygen and/or nitrogen atoms and $R^6$ is represented by the formula $$-(CH_2)_m(CH)_{6-h}(CH_2)_m-,$$

h is an integer of from 0 to 4, k is a number of from 2 to 6, m is a number of from 1 to 20, n is a number of from 2 to 4, p is a number of from 1 to 300, q is 0 or 1 and r is 0, 1 or 2.

Specific examples of $R^3$ radicals are those of the formula

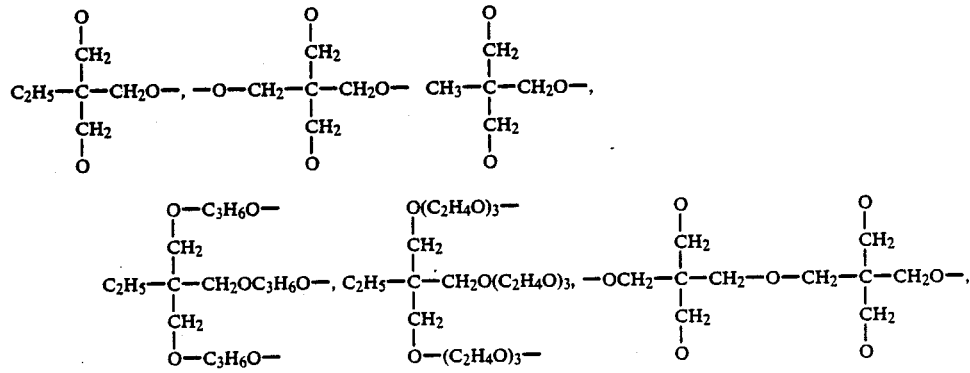

-continued

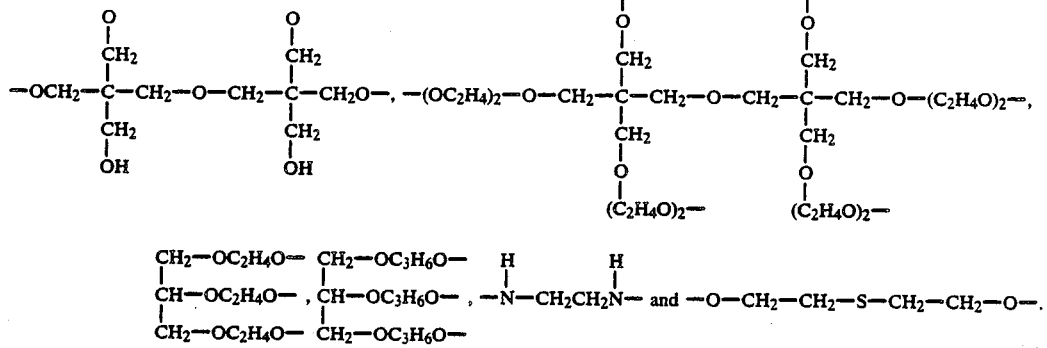

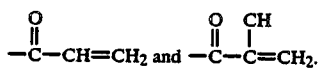, $-N-CH_2CH_2N-$ and $-O-CH_2-CH_2-S-CH_2-CH_2-O-$.

The $R^4$ radical is selected from the group consisting of a monovalent hydrocarbon radical having from 1 to 20 carbon atoms, an acryloyl radical, or a methacryloyl radical and when the terminal atom of $R^3$ is oxygen, the $R^4$ may also be hydrogen.

The specific monovalent hydrocarbon radicals recited for R above are also representative of examples for $R^4$.

Examples of acryloyl and methacryloyl radicals represented by $R^4$ are $$-\overset{O}{\underset{\|}{C}}-CH=CH_2 \text{ and } -\overset{O}{\underset{\|}{C}}-\overset{CH}{\underset{|}{C}}=CH_2.$$

Examples of suitable α,β-unsaturated carbonyl compounds which may be employed in this invention are trimethyloyl propane triacrylate, 1,6-hexanediol diacrylate, 1,4-butane diol diacrylate, poly(butanediol)diacrylate, tetraethylene glycol dimethacrylate, trimethylol propane triethoxytriacrylate, pentaerythritol triacrylate, glycerpropoxytriacrylate, neopentyl glycol diacrylate, ethylene glycol diacrylate, triethylene glycol diacrylate, polyethylene glycol(MW 400)diacrylate, 1,6-hexane glycol diacrylate, polypropylene glycol(MW 400)diacrylate, trimethylol ethane triacrylate, tetramethylolmethane triacrylate, N,N',methylenebisacrylamide, pentaerythritoltetraacrylate, 2,2'-thiodiethanol diacrylate, as well as the methacrylates corresponding to these acrylates.

The α,β-unsaturated carbonyl-functional silicone compositions of this invention are prepared by mixing the α,β-unsaturated carbonyl compound with a thiol-functional organopolysiloxane at a temperature of from about 25° C. up to about 150° C. in the presence of a basic catalyst and in the presence or absence of an organic solvent. Examples of suitable solvents are aliphatic hydrocarbons such as hexane, heptane, octane, aromatic hydrocarbons such as benzene, toluene and xylene and protic solvents such as aliphatic alcohols having from 2 to 8 carbon atoms and alkanol amines.

The amount of α,β-unsaturated carbonyl compound admixed with the thiol-functional organopolysiloxane is such that the molar ratio of the acryloyl or methacryloyl groups of the α,β-unsaturated carbonyl compound to the thiol (SH) groups of the thiol-functional organopolysiloxane is between 2.0 to 10, and more preferably from about 2.2 to 5 moles of acryloyl or methacryloyl groups per mole of thiol group.

The reaction may be conducted at atmospheric pressure or at pressures above, as well as below atmospheric pressure. It is, however, preferred that the reaction be conducted at atmospheric pressure.

Catalysts which do not promote equilibration of the organopolysiloxane or polymerization of the acryloyl and/or methacryloyl groups, are preferably employed. These catalysts are preferably basic catalysts which catalyze the addition of the SH group to the α,β-unsaturated carbonyl group. Examples of suitable catalysts are primary, secondary and tertiary amines such as dimethylamine, trimethylamine, triethylamine, propylamine, dipropylamine and dibutylamine.

The amount of catalyst is not critical and may be present in sufficient amount to promote the addition of the SH group of the thiol-functional organopolysiloxane to the unsaturated group present on the α,β-unsaturated carbonyl compound. The amount of catalyst may range from about 0.1 to 10 percent by weight, based on the weight of the α,β-unsaturated carbonyl compound and the thiol-functional organopolysiloxane. Preferably the amount of catalyst ranges from about 0.1 to about 2 percent by weight, based on the weight of the α,β-unsaturated carbonyl compound and the thiol-functional organopolysiloxane.

Generally, it is preferred that the catalyst be removed or destroyed after the reaction is completed because the presence of the catalyst may adversely affect the properties of the resulting polymer. The catalyst may be removed, for example, by distillation, by washing with water, or it may be destroyed by neutralizing with an acid, such as acetic acid.

As mentioned heretofore, the reaction between the α,β-unsaturated carbonyl compound and the thiol-functional organopolysiloxane may be conducted at a temperature ranging from about 25° C. up to about 150° C. over a period of time of from about 0.5 hours up to about 18 hours, and more preferably at a temperature of from about 70° to about 125° C. for from 2 to 12 hours, in the presence or absence of a solvent. Moreover, it is preferred that the reaction be conducted in an inert atmosphere in the presence of a solvent.

The volatile constituents may be removed in vacuum at a temperature of from about 25° C. up to about 250° C., and more preferably at a temperature of from about 80° to about 175° C.

The α,β-unsaturated carbonyl-functional silicone compositions prepared in accordance with this invention are preferably fluids having viscosities of from about 50 to 2,000,000 mPa.s, and more preferably from about 100 to 500,000 mPa.s at 25° C.

When the compositions are to be cured by exposure to a nonionizing radiation, such as ultraviolet light, then it is preferred that a photosensitizer be incorporated in the $\alpha,\beta$-unsaturated carbonyl-functional silicone compositions of this invention.

Known photosensitizers which may be employed in the present invention include acetophenone, propiophenone, benzophenone, ethylbenzophenone, benzoquinone, p-diacetylbenzene, 1,3-diphenylacetone, xanthone, fluorenone, benzaldehyde, anthraquinone, carbazole, 3-methylacetophenone, 4-chlorobenzophenone, 4,4-dichlorobenzophenone, 4,4'-dimethoxybenzophenone, benzofuran, benzoin, benzoin isopropyl ether, diazo compounds such as N,N-azo-bisisobutyronitrile organic silicon group-containing benzophenone derivatives and polysilanes.

The photosensitizers are generally used in an amount up to about 20 weight percent, based on the weight of the $\alpha,\beta$-unsaturated carbonyl-functional organopolysiloxanes and more preferably from about 0.5 to about 5 weight percent, based on the weight of the $\alpha,\beta$-unsaturated carbonyl-functional organopolysiloxanes.

In addition, the compositions of this invention may be thermally polymerized by adding an organic peroxide, in an amount of from about 0.1 to 10 weight percent, based on the weight of the $\alpha,\beta$-unsaturated carbonyl-functional organopolysiloxanes. Examples of suitable organic peroxides are benzoyl peroxide, dibenzoyl peroxide, di-t-butyl peroxide, t-butyl benzoyl peroxide, cumene hydroperoxide, dicumyl peroxide, lauryl peroxide, $\alpha,\alpha'$-bis(t-butylperoxy)diisopropylbenzene, 2,5-bis(t-butylperoxy)-2,5-dimethylhexane, and t-butyl perbenzoate.

Other compounds may be incorporated in the compositions of the present invention in an amount of from about 0.1 to about 99.9 weight percent, based on the weight of the $\alpha,\beta$-unsaturated carbonyl compound and the thiol-functional organopolysiloxanes, in order to improve hardness of the resulting cured film and adhesion between the compound and a substrate. Examples of suitable compounds which may be employed are those having at least one unsaturated group, such as a vinyl group, an allyl group or a diene group. When the compounds are used to improve adhesion, it is preferred that the compound contain a polar group such as an OH, NH, or epoxy group. Examples of other compounds which may be employed as a reactant or as a diluent in addition to the $\alpha,\beta$-unsaturated carbonyl compounds having at least two acryloyl or methacryloyl groups are $\alpha,\beta$-unsaturated compounds having one acryloyl or methacryloyl group, such as acrylic acid, ethyl acrylate, n-amyl acrylate, benzyl acrylate, cyclohexyl acrylate, 2-N-methylcarbamoyloxyethyl acrylate, diethylaminoacrylate, 2-ethoxyethyl acrylate, n-lauryl acrylate, n-octyl acrylate, octadecyl acrylate, methacrylic acid, propyl methacrylate, methylmethacrylate, stearylacrylate, isobornyl acrylate, dicyclopentylacrylate, allylacrylate, dimethylaminoethyl acrylate, polyethylene glycol monomethyacrylate, N,N-dimethylacrylamide, quaternized products of diethylaminoethyl acrylate, vinyltriethoxysilane, allylacetate, butadiene, styrene, N-vinyl-2-pyrrolidone and the like.

When the $\alpha,\beta$-unsaturated compounds containing one acryloyl or methacryloyl group are incorporated in the compositions containing $\alpha,\beta$-unsaturated carbonyl compounds having at least two acryloyl or methacryloyl groups and the thiol-functional organopolysiloxanes as reactants, it is preferred that the mole ratio of acryloyl or methacryloyl groups to thiol (SH) groups of the thiol-functional organopolysiloxanes range from 1.25 to 10 moles and more preferably from about 1.5 to 5 moles per mole of thiol group.

In addition to the aforementioned components, the compositions of this invention may also contain other additives such as inert solvents, flow control agents, leveling agents, inhibitors, pigments and the like.

The $\alpha,\beta$-unsaturated carbonyl-functional organopolysiloxanes of this invention may be utilized in a wide range of uses. For example, the compositions of this invention can be applied to various substrates to impart release properties thereto. They may be applied as solvent free coatings on various substrates and then cured by radiation and/or heat. They may be used as adhesives, surface modifiers, modifiers for synthetic fibers, potting compounds, as insulating materials for electrical components, coating materials for printed circuit boards, coatings for resist printing and as printing inks.

Examples of suitable substrates which may be coated with the $\alpha,\beta$-unsaturated carbonyl-functional organopolysiloxanes of this invention include paper, glassine paper, clay coated paper, wood-free paper, polyethylene laminated paper, plastic film and metallic foil. A suitable coating weight will generally range from about 0.5 to about 5 grams per square meter.

The radiation polymerizable compositions of this invention are preferably prepared by mixing the $\alpha,\beta$-unsaturated carbonyl-functional polysiloxanes and a photosensitizer at room temperature; however, mild heating may be employed in some instances to facilitate mixing.

The radiation polymerizable compositions can be adjusted to a suitable viscosity for application to a substrate, e.g., from 50 to 100,000 mPa.s at 25° C. by diluting with a solvent and then applied to a substrate by any conventional means known in the art, such as reverse roll coating, coating with the aid of a doctor blade, brushing, spraying or dipping the substrate in the coating composition. Although it is preferred to premix the components of the radiation polymerizable composition prior to application on the substrate, it is possible to form the composition on the substrate by individual application of the components thereto, such as by simultaneously spraying the individual components onto the substrate surface.

The radiation polymerizable composition can be polymerized by exposure to known forms of ionizing or actinic nonionizing radiation. Suitable forms of radiation include ultraviolet light, electron beam, X-ray, gamma ray, beta-ray and the like. Equipment for generating these forms of energy is known in the art. It is preferred that ultraviolet light be employed due to the availability of the equipment for generating ultraviolet light and the relatively low amounts of energy consumed by such equipment.

Polymerization may be carried out in an air atmosphere or in an inert atmosphere such as argon or nitrogen. The time required to polymerize the coating varies with such factors as the particular composition used, the type and wavelength of the radiation source, energy flux, concentration of photosensitizer and thickness of the coating. Generally, the time is relatively short, that is, less than about 10 seconds.

The $\alpha,\beta$-unsaturated carbonyl-functional polysiloxane compositions may also be cured in the presence of heat, alone or in combination with a radiation source. When a radiation source and heat are used to cure these compositions, then a photosensitizer, as well as peroxides may be mixed with the α,β-unsaturated carbonyl-functional organopolysiloxane compositions.

Generally, these compositions will cure rapidly at temperatures ranging from 50° to 200° C. and more preferably at temperatures of from 70° to 150° C.

When the compositions containing a solvent are applied as a coating to a substrate, it is often advantageous to use heat in order to vaporize off the solvent prior to exposing the coating to a radiation source.

Other materials which may be incorporated in the polymerizable compositions of this invention to stabilize the compositions against premature polymerization during storage are inhibitors such as hydroquinone, monomethyl ether of hydroquinone, phenothiazine and di-tert-butyl p-cresol. These inhibitors may be employed in an amount of about 0.1 weight percent or less, based on the weight of the radiation curable compositions.

Specific embodiments of this invention are further illustrated in the following examples in which all parts are by weight unless otherwise specified.

EXAMPLE 1

A reactor equipped with a stirrer, condenser, addition funnel, thermometer and containing 9.1 parts of trimethylol propane triacrylate, 0.2 parts of 4-methoxyphenol, 109.6 parts of isopropanol and 0.2 parts of triethylamine is heated to reflux temperature and then about 100 parts of a thiol-functional polysiloxane fluid of the formula

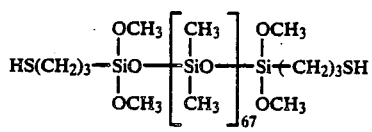

are slowly added to the reactor. The rate of addition is such that the temperature is maintained between 70° and 80° C. After the addition of the thiol-functional polysiloxane is complete, the reactants are refluxed for six hours at a temperature of from about 83° to 85° C. The resultant mixture is cooled to room temperature and then vacuum stripped up to 100° C. at less than 1 torr. The resultant product is opaque and has a viscosity of 1005 mPa.s at 25° C.

EXAMPLE 2

A reactor equipped with a stirrer, condenser, addition funnel, thermometer and containing 133.8 parts of tripropylene glycol diacrylate, 0.2 parts of methoxyphenol, 341 parts of isopropanol and 6.8 parts of triethylamine is heated to reflux temperature and then about 200 parts of a thiol-functional polysiloxane fluid containing units of the formula $HSC_3H_6SiO_{1.5}$, $(CH_3)_3SiO_{0.5}$ and $(CH_3)_2SiO$ in a mole ratio of 3:5:12 are slowly added to the reactor. The rate of addition is such that the temperature is maintained between 70° and 80° C. After the addition of the thiol-functional polysiloxane is complete, the reactants are refluxed for six hours at a temperature of from about 83° to 85° C. The resultant mixture is cooled to room temperature and then 0.17 parts of Irganox ® 101 (available from Ciba-Geigy Corporation) are added and then vacuum stripped up to 120° C. at less than 1 torr. The resultant product has a viscosity of 2,798 mPa.s at 25° C. Analysis of the product by Nuclear Magnetic Resonance shows the following groups to be present:

| | |
|---|---|
| $OSi(CH_3)_2$ | 4.7 |
| $CH_2=CHC\overset{O}{\underset{\|}{\|}}$ | 1.0 |
| $CH_2$ (adjacent to $SiCH_2$) | 3.4 |

EXAMPLE 3

A reactor containing 65.5 parts of trimethylol propane triacrylate, 0.2 parts of 4-methoxyphenol, 265.5 parts of isopropanol and 5.4 parts of triethylamine is heated to reflux temperature and then about 200 parts of a thiol-functional polysiloxane fluid having the formula

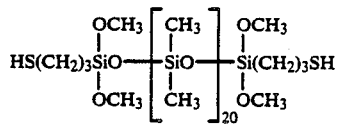

are slowly added to the reactor. The rate of addition is such that the temperature is maintained between 70° and 80° C. After the addition is complete, the reactants are heated to a temperature range of from 80° to 82° C. for six hours. The resultant mixture is cooled to room temperature, then about 0.13 parts of Irganox ® 101 (available from Ciba-Geigy Corporation) are added and then vacuum stripped up to about 150° C. at less than 1 torr. Nuclear Magnetic Resonance Analysis of the resultant product shows the following groups to be present:

| | |
|---|---|
| $OSi(CH_3)_2$ | 20 |
| $CH_2=CHC\overset{O}{\underset{\|}{\|}}$ | 3.64 |
| $CH_2$ (adjacent to $SiCH_2$) | 6.18 |

EXAMPLE 4

A reactor containing 17.4 parts of tripropylene glycol diacrylate, 0.2 parts of 4-methoxyphenol, 158.7 parts of isopropanol and 4.9 parts of triethylamine are heated to reflux temperature, and then about 300 parts of a thiol-functional polysiloxane fluid having the formula

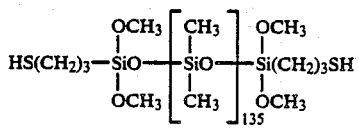

are slowly added to the reactor. The rate of addition is such that the temperature is maintained between 70° and 80° C. After the addition of the thiol-functional polysiloxane fluid is complete, the reactants are refluxed for three hours, cooled to room temperature and then 0.16 parts of Irganox ® 101 (available from Ciba-Geigy Corporation) are added to the resultant product. The mixture is then vacuum stripped at a temperature up to 150° C. at less than 1 torr. The resultant product has a viscosity of 30,164 mPa.s at 25° C. Nuclear Magnetic Resonance Analysis of the product shows the following groups to be present:

|  | Found | Theory |
| --- | --- | --- |
| $OSi(CH_3)_2$ | 71.9 | 67.5 |
| $CH_2{=}CH\overset{\underset{\Vert}{O}}{C}$ | 1 | 1 |

EXAMPLE 5

A reactor containing 49 parts of tripropylene glycol diacrylate, 0.2 parts of 4-methoxyphenol, 356 parts of isopropanol and 7 parts of triethylamine is heated to about 80° C. and then about 300 parts of a thiol-functional polysiloxane fluid having the formula

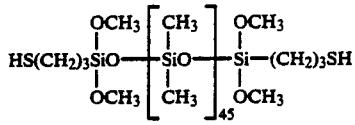

are slowly added to the reactor. The rate of addition is such that the temperature is maintained between 70° and 80° C. After the addition of the thiol-functional fluid is complete, the reactants are refluxed at a temperature of from 80° to 83° C. for about six hours, and then cooled to room temperature. About 0.17 parts of Irganox® 101 (available from Ciba-Geigy Corporation) are added and the resultant mixture is vacuum stripped up to 150° C. at less than 1 torr. The resultant product has a viscosity of 370 mPa.s at 25° C. and Nuclear Magnetic Resonance Analysis shows the following groups to be present in the following mole ratios:

|  |  |
| --- | --- |
| $OSi(CH_3)_2$ | 17.8 |
| $CH_2{=}CH\overset{\underset{\Vert}{O}}{C}$ | 1 |

EXAMPLE 6

A reactor containing 64.2 parts of trimethylol propane triacrylate, 0.9 parts of 4-methoxyphenol, 466.1 parts of isopropanol and 0.9 parts of triethylamine is heated to reflux temperature and then about 400 parts of a thiol-functional polysiloxane fluid having the formula

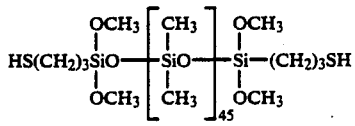

are added at such a rate that the temperature of the reactor is maintained between 70° and 80° C. When the addition is complete, the reactants are refluxed for 10 hours at a temperature of from about 80° to 83° C. The resultant mixture is cooled to room temperature and vacuum stripped up to 110° C. at less than 1 torr. The resultant product has a viscosity of about 1196 mPa.s at 25° C.

To about 3 parts of the product prepared above is added 0.09 parts of Irgacure 184 and then applied to a paper substrate. The coated paper is passed under two ultraviolet lamps, each of which provides 180 watts per square inch at the rate of 100 feet per minute in the presence of a nitrogen atmosphere. A cured film is obtained, which is resistant to smearing.

What is claimed is:

1. A method for preparing a polymerizable α,β-unsaturated carbonyl-functional polysiloxane which comprises reacting at a temperature from 25° to 150° C. and in the presence of a basic catalyst a thiol-functional polysiloxane having at least one unit of the formula

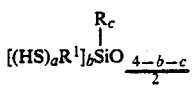

with an α,β-unsaturated carbonyl compound having at least two groups selected from the class consisting of an acryloyl group, a methacryloyl group and mixtures thereof per molecule, where R is selected from the group consisting of a monovalent hydrocarbon radical, a halogenated monovalent hydrocarbon radical having from 1 to 20 carbon atoms and a hydrocarbonoxy radical having from 1 to 10 carbon atoms, $R^1$ is selected from the group consisting of a polyvalent hydrocarbon radical free of aliphatic unsaturation having from 1 to 20 carbon atoms, a hydrocarbon ether, a hydrocarbon thioether, a hydrocarbon ester and a hydrocarbon thioester radical, a is 1, 2 or 3, b is 1 or 2 and c is an integer of from 0 to 2.

2. The method of claim 1, wherein the reaction is conducted in the presence of an organic solvent.

3. The method of claim 1, wherein the molar ratio of the acryloyl groups or the methacryloyl groups, of the α,β-unsaturated carbonyl compound to SH groups of the thiol-functional organopolysiloxane is from 1.2 to 10.

4. The method of claim 1, wherein the molar ratio of the acryloyl groups or methacryloyl groups of the α,β-unsaturated carbonyl compound to the SH groups of the thiol-functional polysiloxane is from about 2.2 to 5 moles.

5. The method of claim 1, wherein the catalyst is an organic amine.

6. The method of claim 1, wherein the catalyst is a tertiary amine.

7. The method of claim 1, wherein the α,β-unsaturated carbonyl compound has the formula

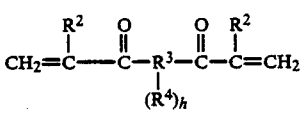

where $R^2$ is selected from the group consisting of methyl and hydrogen, $R^3$ is a linear or branched radical having 2, 3, 4, 5 or 6 valences, in which the radical is selected from the group consisting of a substituted hydrocarbon radical, a hydrocarbon ether, and a thioether and the terminal groups are selected from the group consisting of oxygen and nitrogen, $R^4$ is a radical linked to the terminal oxygen or nitrogen atoms of $R^3$ and is selected from the group consisting of a monovalent hydrocarbon radical having from 1 to 20 carbon atoms, an acryloyl radical and a methacryloyl radical and when the terminal atom of $R^3$ is oxygen then $R^4$ may be hydrogen and h is an integer of from 0 to 4.

8. The method of claim 1, wherein the $\alpha,\beta$-unsaturated carbonyl compound is trimethylol propane triacrylate.

9. The method of claim 1, wherein the $\alpha,\beta$-unsaturated carbonyl compound is pentaerythritol triacrylate.

10. The method of claim 1, wherein the $\alpha,\beta$-unsaturated carbonyl compound is hexanediol diacrylate.

11. The method of claim 1, wherein a mixture containing an $\alpha,\beta$-unsaturated carbonyl compound is employed having at least two groups selected from the group consisting of acryloyl groups, methacryloyl groups and mixtures thereof and an $\alpha,\beta$-unsaturated carbonyl compound having one group selected from an acryloyl group and a methacryloyl group.

12. The method of claim 1, wherein a mixture containing an $\alpha,\beta$-unsaturated carbonyl compound is employed having at least two acryloyl groups and an $\alpha,\beta$-unsaturated carbonyl compound having one acryloyl group in which the mole ratio of acryloyl groups is from 1.25 to 10 moles of acryloyl groups per mole of thiol group.

13. The method of claim 1, wherein a mixture containing an $\alpha,\beta$-unsaturated carbonyl compound is employed having at least two methacryloyl groups and an $\alpha,\beta$-unsaturated carbonyl compound having one methacryloyl group in which the mole ratio of methacryloyl groups is from 1.25 to 10 moles of methacryloyl groups per mole of thiol group.

14. The method of claim 1, wherein a mixture containing an $\alpha,\beta$-unsaturated carbonyl compound is employed having at least two acryloyl groups and $\alpha,\beta$-unsaturated carbonyl compound having one methacryloyl group.

15. The method of claim 1, where the reaction is conducted in the presence of an alcohol.

16. The method of claim 1, wherein the reaction is conducted at a temperature of from 70° to 125° C.

17. A composition prepared in accordance with the method of claim 1.

18. A composition prepared in accordance with the method of claim 1.

19. A composition prepared in accordance with the method of claim 11.

20. A radiation polymerizable composition containing the composition prepared in accordance with the method of claim 1 and a photosensitizer.

21. A radiation polymerizable composition containing the composition prepared in accordance with the method of claim 7 and a photosensitizer.

22. A radiation polymerizable composition containing the composition prepared in accordance with the method of claim 11 and a photosensitizer.

23. A polymerizable composition containing the composition prepared in accordance with the method of claim 1 and a peroxide.

24. A polymerizable composition containing the composition prepared in accordance with the method of claim 7 and a peroxide.

25. A polymerizable composition containing the composition prepared in accordance with the method of claim 11 and a peroxide.

26. A substrate coated with the cured composition of claim 1.

27. A substrate coated with the cured composition of claim 11.

28. A substrate coated with the cured composition of claim 21.

29. A substrate coated with the cured composition of claim 23.

* * * * *